(12) United States Patent
Pautis et al.

(10) Patent No.: US 10,550,796 B2
(45) Date of Patent: Feb. 4, 2020

(54) TURBOJET ENGINE COMPRISING A NACELLE EQUIPPED WITH REVERSER FLAPS

(71) Applicant: Airbus Operations SAS, Toulouse (FR)

(72) Inventors: Olivier Pautis, Merville (FR); Laurent Tizac, Seilh (FR); Frédéric Ridray, L'Isle Jourdain (FR); Lionel Czapla, Cornebarrieu (FR); Frédéric Piard, Tournefeuille (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 66 days.

(21) Appl. No.: 16/017,634

(22) Filed: Jun. 25, 2018

(65) Prior Publication Data

US 2019/0003421 A1    Jan. 3, 2019

(30) Foreign Application Priority Data

Jun. 29, 2017    (FR) ..................... 17 56037

(51) Int. Cl.
    *F02K 1/72*    (2006.01)
    *F02K 1/76*    (2006.01)
    *F02K 3/06*    (2006.01)

(52) U.S. Cl.
    CPC ............. *F02K 1/72* (2013.01); *F02K 1/763* (2013.01); *F02K 3/06* (2013.01); *F05D 2220/323* (2013.01); *F05D 2240/14* (2013.01)

(58) Field of Classification Search
    CPC ... F02K 1/72; F02K 1/763; F02K 3/06; F05D 2220/323; F05D 2240/14
    See application file for complete search history.

(56) References Cited

U.S. PATENT DOCUMENTS

| 3,511,055 A | 5/1970 | Timms |
| 3,600,894 A | 8/1971 | McClain |
| 2001/0010148 A1 | 8/2001 | Michel et al. |
| 2017/0175674 A1 | 6/2017 | Schrell |
| 2019/0003420 A1* | 1/2019 | Pautis ...................... F02K 1/72 |

FOREIGN PATENT DOCUMENTS

EP    3181882    6/2017

OTHER PUBLICATIONS

French Search Report, dated Mar. 13, 2018, priority document.

* cited by examiner

*Primary Examiner* — Richard A Edgar
(74) *Attorney, Agent, or Firm* — Greer, Burns & Crain, Ltd.

(57) ABSTRACT

A turbofan comprising a fan casing and a nacelle comprising a cowl translatable between an advanced position and a pushed-back position in which the mobile cowl and the fan casing define a window therebetween. The nacelle also comprises reverser flaps, each reverser flap being mounted in a linked manner on the mobile assembly between a closed position in which it obstructs the window and an open position in which it does not obstruct the window. The nacelle also has an impelling mechanism comprising a lever arm rotatable on the mobile assembly and having a roller, a connecting rod mounted rotatably between the reverser flap and the lever arm, and a channel receiving the roller, the channel having a front part parallel with the translation direction and a rear part extending after the front part and oriented inward as it progresses from the front toward the rear.

3 Claims, 4 Drawing Sheets

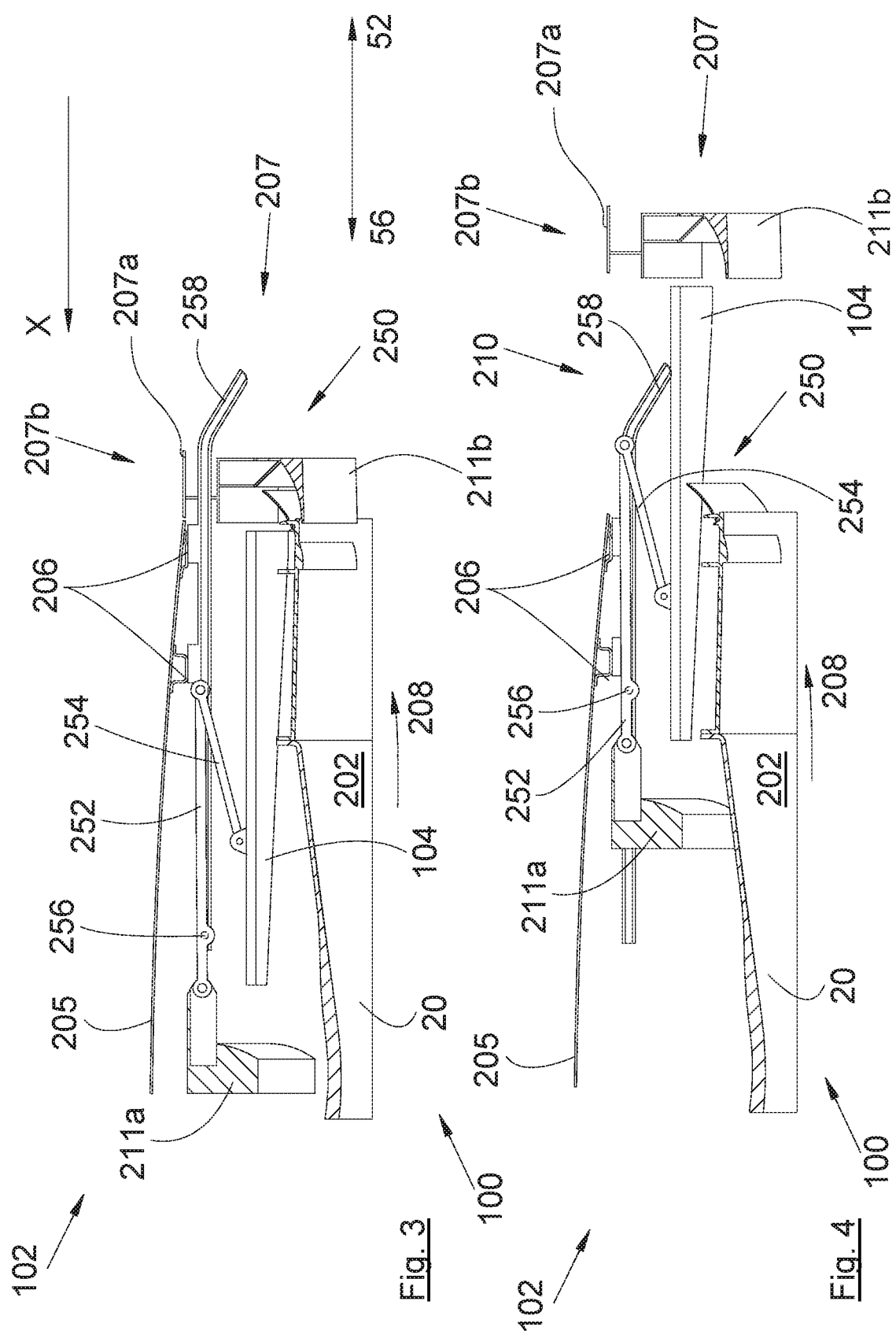

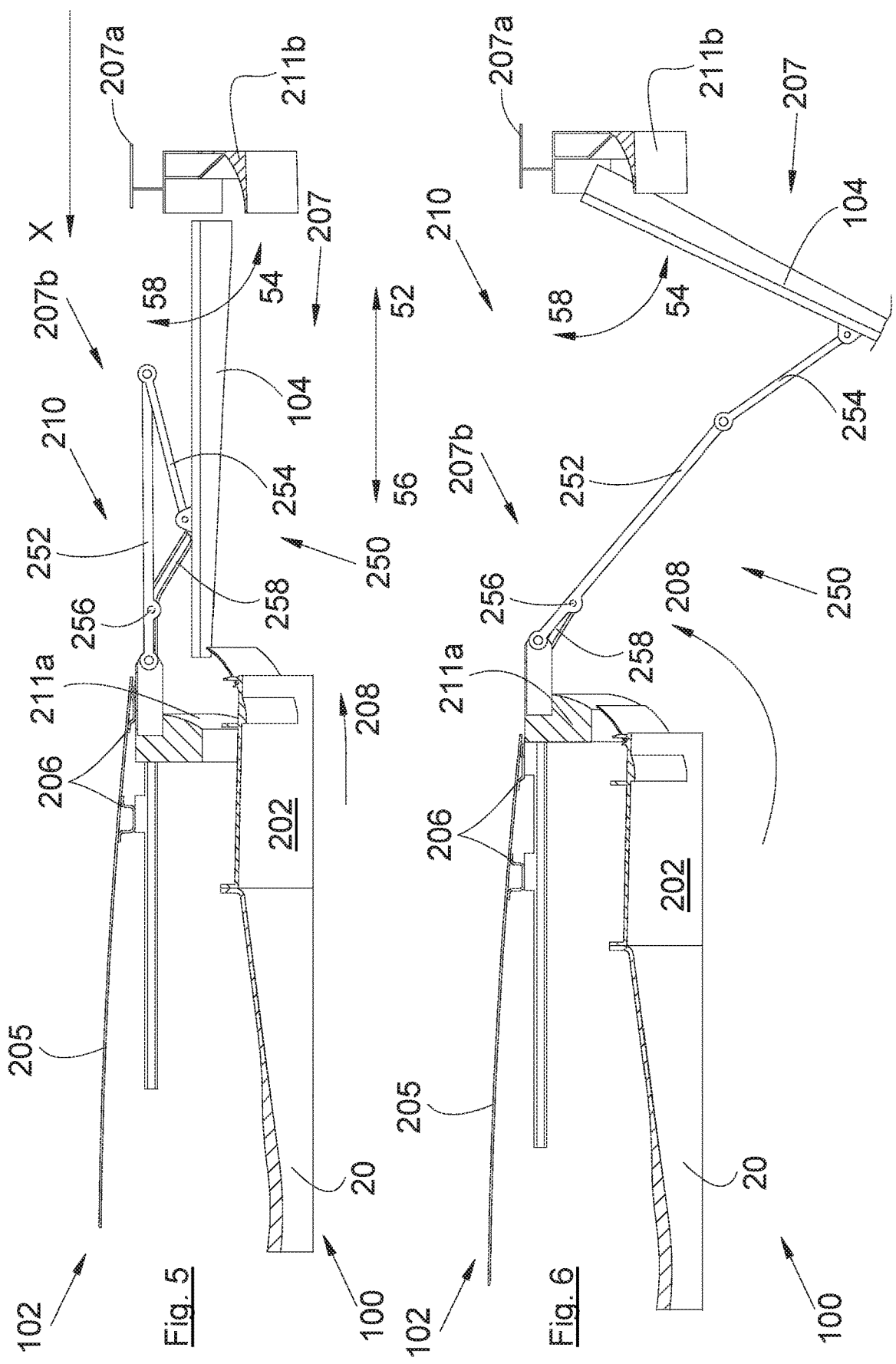

TURBOJET ENGINE COMPRISING A NACELLE EQUIPPED WITH REVERSER FLAPS

CROSS-REFERENCES TO RELATED APPLICATIONS

This application claims the benefit of the French patent application No. 1756037 filed on Jun. 29, 2017, the entire disclosures of which are incorporated herein by way of reference.

TECHNICAL FIELD

The present invention relates to a turbofan which comprises a nacelle equipped with reverser flaps, and to an aircraft comprising at least one such turbofan.

BACKGROUND OF THE INVENTION

An aircraft comprises a fuselage to each side of which is fixed a wing. At least one turbofan is suspended under each wing. Each turbofan is fixed under the wing by means of a pylon that is fixed between the structure of the wing and the structure of the turbofan.

The turbofan comprises an engine and a nacelle that is fixed around the engine.

The nacelle comprises a plurality of reverser flaps, each one being mobile between a closed position in which it becomes continuous with the exterior surface of the nacelle and an open position in which it opens a window in the wall of the nacelle to expel the air of the bypass flow to the outside.

The reverser flap is mounted rotatably on the structure of the nacelle so as to pass from a closed position in which the reverser flap does not obstruct the bypass flow duct to an open position in which the reverser flap obstructs the duct.

Thus, in the open position, the reverser flap deflects some of the bypass flow to the outside via the window.

The movement of each reverser flap is commanded by one or more actuators which are relatively heavy.

Although the mechanism of a reverser flap of this kind is entirely satisfactory, it is desirable to find different mechanisms.

SUMMARY OF THE INVENTION

An object of the present invention is to propose a turbofan comprising a nacelle equipped with reverser flaps with a different opening mechanism.

To that end, the invention proposes a turbofan comprising an engine and a nacelle surrounding the engine which comprises a fan casing and a core arranged inside the fan casing, in which a duct for a bypass flow is defined between the core and the fan casing, the nacelle comprising:
  a fixed structure,
  a fan cowl fixedly mounted on the fixed structure and a mobile assembly comprising a mobile cowl and being translatable with respect to the fixed structure in a translation direction between an advanced position in which the mobile cowl is brought closer to the fan cowl and a pushed-back position in which the mobile cowl is moved away from the fan cowl toward the rear,
  a window defined upstream by the fan cowl and downstream by the mobile cowl, the window being open, in the pushed-back position, between the duct and the outside of the nacelle,
  a reverser flap mounted on the mobile assembly tilting between a closed position in which it obstructs the window and an open position in which it does not obstruct the window, and
  an impelling mechanism provided to coordinate and delay the passage of the reverser flap from the closed position to the open position with respect to the passage of the mobile cowl from the advanced position to the pushed-back position and vice versa, the impelling mechanism being provided to produce a first combination providing, from the closed position and from the advanced position:
  a rearward translation of the mobile assembly in the translation direction in order to move the mobile assembly from the advanced position to the pushed-back position by passing via an intermediate position, and
  from the moment that the mobile assembly passes via the intermediate position, tilting of the reverser flap in order to move the reverser flap from the closed position to the open position, and
  the impelling mechanism also being provided to produce a second combination providing, from the open position and from the pushed-back position:
  a forward translation of the mobile assembly in the translation direction in order to move the mobile assembly from the pushed-back position to the advanced position by passing via the intermediate position, and
  up to the moment that the mobile assembly passes via the intermediate position, tilting of the reverser flap in the reverse direction in order to move the reverser flap from the open position to the closed position,
  the impelling mechanism comprising:
  a lever arm having a front end and a rear end, wherein the front end is mounted rotatably on the mobile assembly and wherein the lever arm has, between the front end and the rear end, at least one rotatable roller,
  a connecting rod having a first end and a second end and wherein the first end is mounted rotatably on the reverser flap and wherein the second end is mounted rotatably on the rear end of the lever arm, and
  for each roller, a channel fixed to the fixed structure and in which the roller is received, the channel having a front part parallel with the translation direction and a rear part extending after the front part and oriented inward as it progresses from the front toward the rear, the junction between the first part and the second part taking the form of a bend and
  wherein the position of the roller at this bend corresponds to the intermediate position.

Such a turbojet engine provides better guiding of the reverser flaps.

Advantageously, the turbofan comprises two rollers aligned on either side of the lever arm and two channels with the same shapes and parallel with one another, each receiving a roller.

The invention also proposes an aircraft comprising at least one turbofan in accordance with one of the above variants.

BRIEF DESCRIPTION OF THE DRAWINGS

The features of the invention that are mentioned above, along with others, will become more clearly apparent on reading the following description of an exemplary embodiment, the description being given with reference to the appended drawings, in which:

FIGS. 3-6 are side and sectional views through a midplane of a part of the turbojet engine according to the invention in various positions.

DETAILED DESCRIPTION OF THE PREFERRED EMBODIMENTS

Figure 1:
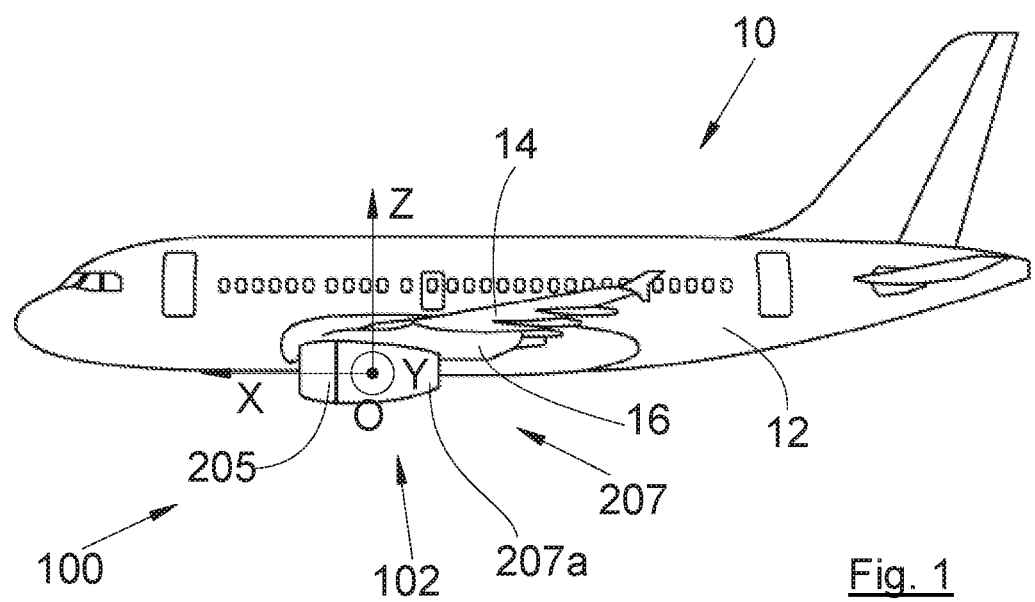
FIG. 1 is a side view of an aircraft comprising a turbojet engine according to the invention.

In the following description, the terms relating to a position are taken with reference to an aircraft in a forward movement position as it is shown in FIG. 1. In particular, the front and rear positions are taken with reference to the normal forward movement direction of the aircraft.

FIG. 1 shows an aircraft 10 that comprises a fuselage 12, to each side of which is fixed a wing 14 that bears at least one turbofan 100 according to the invention. The turbofan 100 is fixed under the wing 14 by means of a pylon 16.

Figure 2:
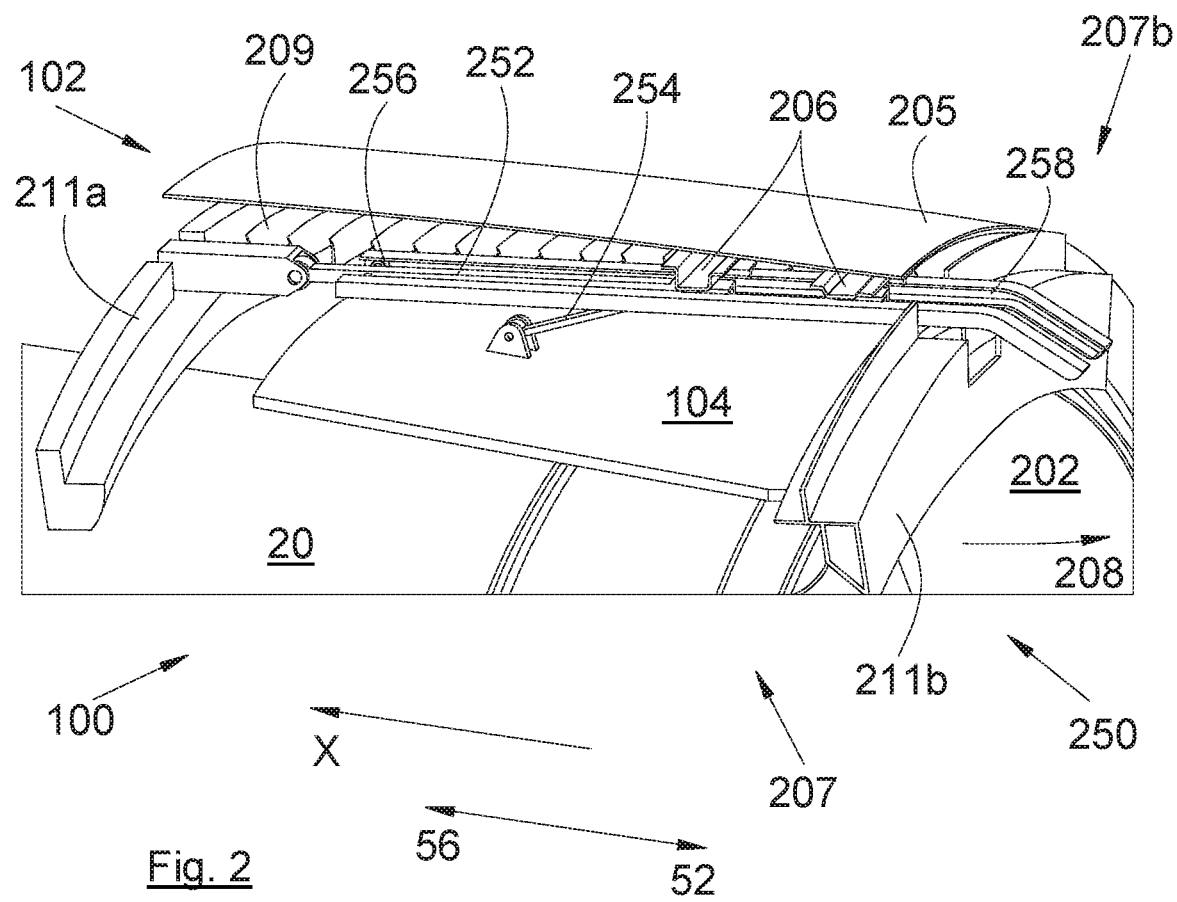
FIG. 2 is a perspective view of the turbojet engine according to the invention.

FIG. 2 shows a part of the turbofan 100 which has a nacelle 102 and an engine which is housed inside the nacelle 102 and which comprises a fan casing 20 and a core arranged inside the fan casing 20.

In the following description, and by convention, X denotes the longitudinal axis of the turbofan 100 that is parallel with the longitudinal axis of the aircraft 10 or roll axis, oriented positively in the direction of forward movement of the aircraft 10, Y denotes the transverse axis parallel with the pitch axis of the aircraft which is horizontal when the aircraft is on the ground, and Z denotes the vertical axis parallel with the yaw axis when the aircraft is on the ground, these three directions X, Y and Z being mutually orthogonal and forming an orthonormal frame of reference, the origin of which is the center of gravity of the turbofan 100.

FIGS. 3-6 show part of the nacelle 102.

As shown in FIGS. 2-6, the turbofan 100 has, between the core and the fan casing 20, a duct 202 in which flows the bypass flow 208 coming from the air intake through the fan.

The nacelle 102 has a fixed structure 206 which comprises, in this case, among other elements, two rings which are fixed, for example, at 12 o'clock and 6 o'clock, and which bears a fan cowl 205, which is fixed.

The nacelle 102 has a mobile assembly 207 which, in this case, incorporates cascades 209 allowing the redirection of the flow passing from the inside to the outside and has a sliding frame 207b and a mobile cowl 207a rigidly connected to the sliding frame 207b and forming the outer walls of the nacelle 102. Of course, it is also possible for the cascades to be absent.

The sliding frame 207b is apertured and, in this case, takes the form of a front ring 211a and a rear ring 211b which are rigidly connected. The mobile assembly 207, i.e., the mobile cowl 207a and the sliding frame 207b, are translatable in a translation direction that is generally parallel with the longitudinal axis X.

The mobile assembly 207 is translated, for example, via systems of guide rails between the fixed structure 206 and the sliding frame 207b.

The mobile assembly 207 is mobile between an advanced position (FIGS. 2 and 3) and a pushed-back position (FIG. 6) and vice versa, FIGS. 4 and 5 showing intermediate positions between the advanced position and the pushed-back position. In the advanced position, the mobile assembly 207 is positioned as far forward as possible such that the mobile cowl 207a is brought closer to the fan cowl 205 in order to form aerodynamic continuity. In the pushed-back position, the mobile assembly 207 is positioned as far to the rear as possible such that the mobile cowl 207a is moved away from the fan cowl 205 in order to clear a window 210.

The nacelle 102 also comprises an actuation system for translating the mobile assembly 207 from the advanced position to the pushed-back position and vice versa. The actuation system includes, for example, one or more motors and one or more jacks, wherein each is commanded by a control unit, for example of the processor type, which commands the movements in either direction depending on the needs of the aircraft 10. For example, in the case of an actuation system comprising jacks, each is mounted, for example, between the sliding frame 207b and the fixed structure of the nacelle 102.

In the advanced position, the sliding frame 207b, more particularly the rear ring 211b, and the fan casing 20 extend such as to define the outer surface of the duct 202.

In the pushed-back position, the sliding frame 207b and the fan casing 20 are at a distance and define therebetween the window 210 which is open between the duct 202 and the outside of the nacelle 102 in this case through the cascades 209. This means that the air coming from the bypass flow 208 passes through the window 210 by passing through the cascades 209 in order to return to the outside of the turbofan 100.

In the pushed-back position, the fan casing 20 and the fan cowl 205 define the window 210 upstream with respect to the longitudinal axis X and the mobile cowl 207a and in this case the rear ring 211b define the window 210 downstream with respect to the longitudinal axis X. The window 210 is located facing the cascades 209.

The sliding frame 207b bears reverser flaps 104 distributed over the periphery of the nacelle 102 depending on the angular opening of the window 210 about the longitudinal axis X. Each reverser flap 104 extends in this case between the front ring 211a and the rear ring 211b, and each is mounted in a linked manner between a closed position (FIGS. 2-5) and an open position (FIG. 6) and vice versa.

The closed position can be taken when the sliding frame 207b is in the advanced position or in the pushed-back position. The open position can be taken only when the sliding frame 207b is in the pushed-back position.

In the closed position, each reverser flap 104 obstructs a zone of the apertured part of the sliding frame 207b when the latter is in the advanced position and the same zone of the apertured part of the sliding frame 207b and a zone of the window 210 when the sliding frame 207b is in the pushed-back position. In the open position, the reverser flap 104 obstructs neither the zone of the window 210 nor the apertured part of the sliding frame 207b allowing the bypass flow 208 to pass.

Thus, in the closed position, each reverser flap 104 is generally in a plane parallel with the axis X and in the open position, each reverser flap 104 is positioned generally in a plane perpendicular to the axis X, through the duct 202 and deflects at least some of the bypass flow 208 toward the outside through the window 210.

In the advanced position, each reverser flap 104 is positioned outside the fan casing 20.

Each reverser flap 104 is linked to the downstream part of the sliding frame 207b, for example, on hinges fixed to the sliding frame 207b, and in this case more particularly to the rear ring 211b, whereas the opposite free edge is positioned in the upstream direction in the closed position and toward the engine in the open position. Each reverser flap 104 is thus mounted on the mobile assembly 207 tilting about a tilting axis which is generally tangential with respect to the cylindrical shape of the nacelle 102.

The passage of the reverser flap 104 from the closed position to the open position is coordinated but delayed with respect to the passage of the mobile assembly 207 from the advanced position to the pushed-back position, and vice versa. During the passage from the closed position to the open position, the tilting of the reverser flap 104 starts when the mobile assembly 207 passes via an intermediate position (FIG. 5) between the advanced position and the pushed-back position. Conversely, during the passage from the open position to the closed position, the tilting of the reverser flap 104 stops when the mobile assembly 207 passes via the intermediate position while coming back from the pushed-back position toward the advanced position.

This coordination is provided by an impelling mechanism 250 which produces, from the closed position and from the advanced position, a first combination providing:

a rearward translation (arrow 52) of the mobile assembly 207 in the translation direction from the advanced position toward the pushed-back position by passing via the intermediate position, and, from the moment that the mobile assembly 207 passes via the intermediate position, tilting (arrow 54) of the reverser flap 104 which moves the reverser flap 104 from the closed position to the open position.

As is explained, the rearward translation of the mobile assembly 207 continues as the reverser flap 104 tilts.

Conversely, the reverser flap 104 is passed from the open position to the closed position by the same impelling mechanism 250 which is also provided to produce a second combination providing, from the open position and from the pushed-back position:

a forward translation (arrow 56) of the mobile assembly 207 in the translation direction from the pushed-back position to the advanced position by passing via the intermediate position, and up to the moment that the mobile assembly 207 passes via the intermediate position, tilting (arrow 58) of the reverser flap 104 in the reverse direction which returns the reverser flap 104 from the open position to the closed position.

As is explained, the forward translation of the mobile assembly 207 starts at the same time as the tilting of the reverser flap 104, then the tilting of the reverser flap 104 stops, whereas the translation of the mobile assembly 207 continues. Thus, the mobile assembly 207 and the reverser flap 104 move firstly simultaneously, then from a certain moment, the reverser flap 104 stops and the mobile assembly 207 moves alone.

Figure 7:
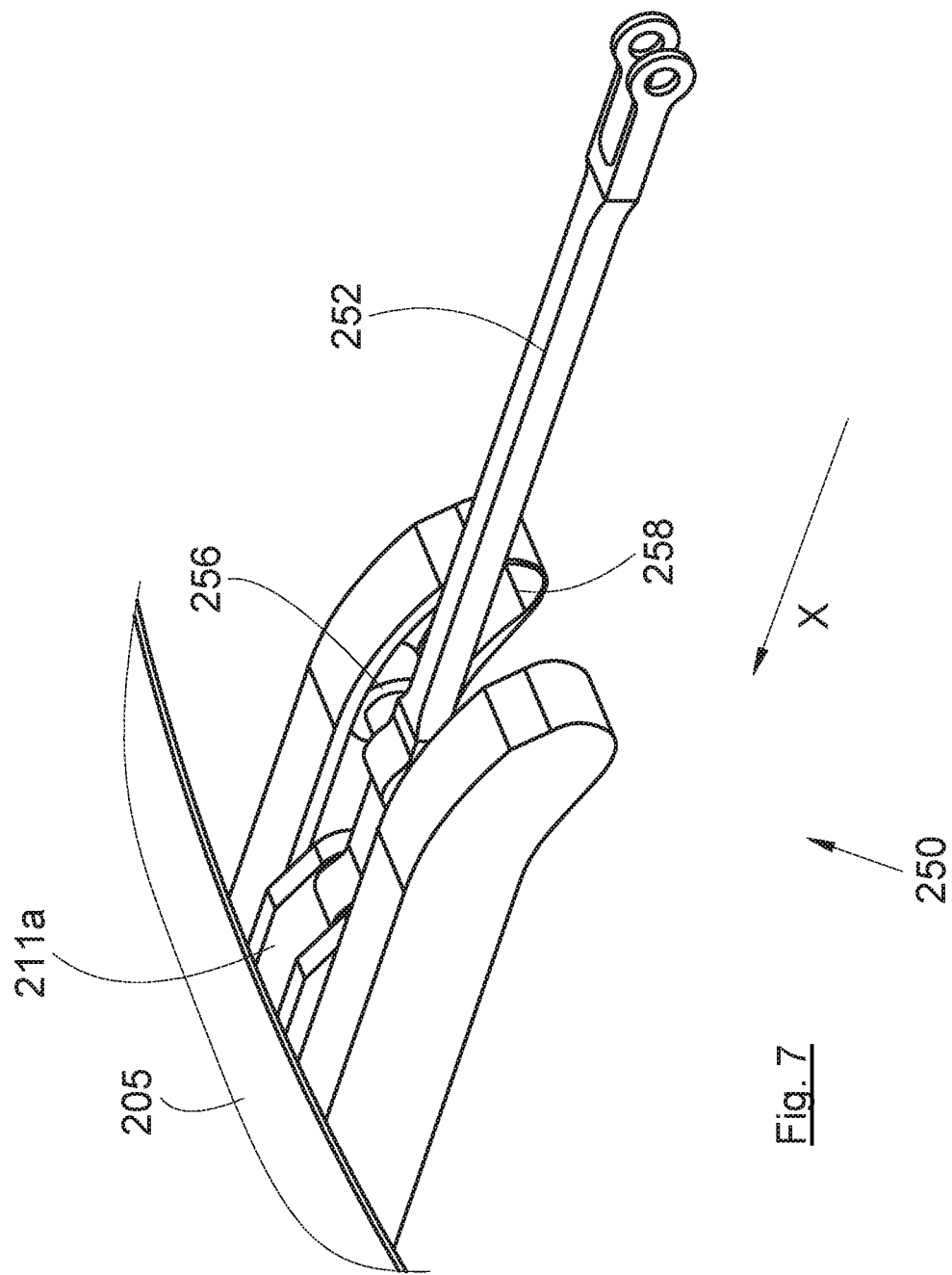
FIG. 7 is a perspective view of a detail of an impelling mechanism according to the invention.

FIG. 7 shows a detail of the impelling mechanism 250.

The impelling mechanism 250 includes, for each reverser flap 104:

a lever arm 252 having a front end and a rear end, wherein the front end is mounted rotatably on the mobile assembly 207, more particularly in this case on the front ring 211*a*, and wherein the lever arm 252 has, between the front end and the rear end, at least one roller 256 mounted rotatably about a rolling axis, a connecting rod 254 having a first end and a second end and wherein the first end is mounted rotatably on the reverser flap 104 and wherein the second end is mounted rotatably on the rear end of the lever arm 252, and for each roller 256, a channel 258 fixed to the fixed structure 206 and in which the roller 256 is received, the channel 258 having a first front part parallel with the translation direction and a second rear part extending after the front part and oriented inward as it progresses from the front toward the rear.

In the invention embodiment set out here, in the closed position, the first end of the connecting rod 254 is located in the forward direction with respect to the second end such as to form a Z that can be opened out during the passage into the open position.

The junction between the first part and the second part takes the form of a bend and the position of the roller 256 at this bend corresponds to the intermediate position.

The operation of the impelling mechanism 250 is then as follows, from the closed position and from the advanced position:

the mobile assembly 207 and the impelling mechanism 250 are translated (52) rearward (FIG. 3), the roller 256 being in the first front part of the channel 258 and being guided thereby (FIG. 4) in translation up to the bend, when the mobile assembly 207 passes via the intermediate position, the roller 256 reaches the bend and passes into the second rear part of the channel 258 (FIG. 5), the continuation of the rearward translation of the mobile assembly 207 and of the front end of the lever arm 252, and the positioning of the roller 256 guided by the second part of the channel 258 tend to unfold the lever arm 252 and the connecting rod 254 in order to move the flap 104 (54) toward the open position thereof (FIG. 6).

Conversely, the operation of the impelling mechanism 250 is as follows, from the open position and from the pushed-back position:

the mobile assembly 207 and the front end of the lever arm 252 are translated (56) forward (FIG. 6) and while the roller 256 is guided by the second part of the channel 258, the lever arm 252 and the connecting rod 254 are folded up in order to move the flap 104 (56) toward the closed position thereof, when the mobile assembly 207 passes via the intermediate position, the flap 104 is in the closed position and the roller 256 reaches the bend and passes into the first part of the channel 258 (FIG. 5), the forward translation of the mobile assembly 207 and of the impelling mechanism 250 then continues up to the advanced position (FIG. 3) in which the roller 256 is guided by the first part of the channel 258 (FIG. 4).

The rotation axes of the lever arm 252 and of the connecting rod 254 and the rolling axes relating to a same reverser flap 104, are parallel with one another and generally parallel with the tilting axis of the reverser flap 104.

In the invention embodiment set out in FIGS. 2-7, there are two rollers 256 which are aligned on either side of the lever arm 252 and, consequently, there are also two channels 258 with the same shapes and parallel with one another, each receiving a roller 256.

The invention has been particularly described with respect to a nacelle under a wing but it can be used for a nacelle located at the rear of the fuselage.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A turbofan comprising an engine and a nacelle surrounding the engine which comprises a fan casing and a core arranged inside the fan casing, in which a duct for a bypass flow is defined between the core and the fan casing, said nacelle comprising:
    a fixed structure,
    a fan cowl fixedly mounted on the fixed structure and a mobile assembly comprising a mobile cowl and being translatable with respect to the fixed structure in a translation direction between an advanced position in which the mobile cowl is brought closer to the fan cowl and a pushed-back position in which the mobile cowl is moved away from the fan cowl toward the rear,
    a window defined upstream by the fan cowl and downstream by the mobile cowl, said window being open, in the pushed-back position, between the duct and the outside of the nacelle,
    a reverser flap mounted on the mobile assembly tilting between a closed position in which the reverser flap obstructs the window and an open position in which the reverser flap does not obstruct the window, and
    an impelling mechanism provided to coordinate and delay a passage of the reverser flap from the closed position to the open position with respect to a passage of the mobile cowl from the advanced position to the pushed-back position and vice versa, said impelling mechanism being provided to produce a first combination providing, from the closed position and from the advanced position:
        a rearward translation of the mobile assembly in the translation direction in order to move the mobile assembly from the advanced position to the pushed-back position by passing via an intermediate position, and
        from the moment that the mobile assembly passes via the intermediate position, tilting of the reverser flap in order to move the reverser flap from the closed position to the open position, and
    the impelling mechanism also being provided to produce a second combination providing, from the open position and from the pushed-back position:
        a forward translation of the mobile assembly in the translation direction in order to move the mobile assembly from the pushed-back position to the advanced position by passing via the intermediate position, and
        up to a moment that the mobile assembly passes via the intermediate position, tilting of the reverser flap in a reverse direction in order to move the reverser flap from the open position to the closed position,
    the impelling mechanism comprising:
        a lever arm having a front end and a rear end, wherein the front end is mounted rotatably on the mobile assembly and wherein the lever arm has, between the front end and the rear end, at least one rotatable roller,
        a connecting rod having a first end and a second end and wherein the first end is mounted rotatably on the reverser flap and wherein the second end is mounted rotatably on the rear end of the lever arm, and
        for each roller, a channel fixed to the fixed structure and in which said roller is received, said channel having a front part parallel with the translation direction and a rear part extending after the front part and oriented inward as it progresses from the front toward the rear, a junction between the front part and the rear part forming a bend, and
        wherein the position of the roller at this bend corresponds to the intermediate position.

2. A turbofan according to claim 1, further comprising two rollers aligned on either side of the lever arm and wherein the turbofan has two channels with the same shapes and parallel with one another, each receiving a roller.

3. An aircraft comprising at least one turbofan according to claim 1.

* * * * *